(12) United States Patent
Gretz

(10) Patent No.: US 9,472,935 B1
(45) Date of Patent: Oct. 18, 2016

(54) FS BOX HOLDER AND METHOD FOR RAPID MOUNTING OF A FIELD SERVICE BOX

(71) Applicant: Arlington Industries, Inc., Scranton, PA (US)

(72) Inventor: Thomas J. Gretz, Port St. Lucie, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 174 days.

(21) Appl. No.: 14/490,763

(22) Filed: Sep. 19, 2014

Related U.S. Application Data

(60) Provisional application No. 61/880,428, filed on Sep. 20, 2013.

(51) Int. Cl.
*H02G 3/10* (2006.01)
*H02G 3/08* (2006.01)

(52) U.S. Cl.
CPC ................. *H02G 3/10* (2013.01); *H02G 3/081* (2013.01)

(58) Field of Classification Search
CPC .......... H02G 3/10; H02G 3/081; H02G 3/08; H02G 3/32; H05K 5/00; H05K 5/02; H05K 5/0204; H05K 5/0217
USPC .......... 174/50, 480, 481, 45 R, 58, 493, 503, 174/535, 563; 248/906, 218.4, 219.1, 248/220.21, 226.11, 219.4; 220/3.2, 4.02, 220/3.5
See application file for complete search history.

(56) References Cited

U.S. PATENT DOCUMENTS

| | | | | |
|---|---|---|---|---|
| 2,757,817 A * | 8/1956 | Egan | ...................... | H02G 3/125 220/3.5 |
| 4,101,191 A * | 7/1978 | Gould | .................... | G08G 1/005 248/230.1 |
| 4,842,156 A * | 6/1989 | Nattel | .................... | H02G 3/125 220/3.9 |
| 4,934,644 A * | 6/1990 | Nagy | .................... | H02G 3/105 248/906 |
| 5,426,577 A * | 6/1995 | Gordin | .................... | E04H 12/24 174/45 R |
| 6,185,303 B1 * | 2/2001 | Losey | .................... | A47B 96/06 248/219.4 |
| 6,229,948 B1 * | 5/2001 | Blee | ........................ | G02B 6/483 385/134 |
| 6,486,399 B1 * | 11/2002 | Armstrong | ........... | H05K 5/0204 174/58 |
| 6,831,228 B2 * | 12/2004 | Lalancette | ............. | H02G 3/123 174/50 |
| 6,974,908 B2 * | 12/2005 | White | ...................... | H02G 3/32 174/50 |
| 7,059,572 B2 * | 6/2006 | Ware | ........................ | H02G 3/10 174/45 R |

* cited by examiner

*Primary Examiner* — Angel R Estrada

(57) ABSTRACT

An FS box holder for mounting a field service (FS) electrical box to a cylindrical structure. The FS box holder includes a front panel and two end walls and two side walls extending from the front panel. Elongated slots are provided in the side walls and a threaded nipple extends from the front panel. A post attachment means is provided for securing said FS box holder to a post or similar upright support. The post attachment means includes a pipe clamp for securing through the elongated slots of the FS box holder. The invention further includes an electrical box having a threaded socket therein and a box attachment means for securing the electrical box to the FS box holder. The box attachment means includes a threaded socket on the electrical box and a threaded nipple on the FS box holder.

9 Claims, 11 Drawing Sheets

FS BOX HOLDER AND METHOD FOR RAPID MOUNTING OF A FIELD SERVICE BOX

This application claims the priority of Provisional U.S. Patent Application Ser. No. 61/880,428 filed Sep. 20, 2013.

FIELD OF THE INVENTION

The present invention relates to electrical boxes and specifically to a device and method for attaching a field service (FS) box to a pipe or similar structure.

BACKGROUND OF THE INVENTION

Outdoor electrical outlets are commonly used to provide electrical service near gardens, swimming pools, patios and the like. They are used to provide a weatherproof enclosure for mounting thermostats, timers for watering systems, and switches outdoors. These outdoor enclosures are commonly referred to as FS or field service boxes.

Upright posts or pipes are at times the most convenient structure for mounting a conventional FS box in an outdoor area. However, the FS box, which typically includes a flat back wall, does not easily mount to a cylindrical structure such as a post.

Accordingly, there is a need for a device and method enables the mounting of an FS box to a cylindrical structure such as a post.

BRIEF SUMMARY OF THE INVENTION

The current invention is a FS box holder for mounting a field service (FS) electrical box to a cylindrical structure. The FS box holder includes a front panel and two end walls and two side walls extending from the front panel. Elongated slots are provided in the side walls and a threaded nipple extends from the front panel. A post attachment means is provided for securing said FS box holder to a post or similar upright support. The post attachment means includes a pipe clamp for securing through the elongated slots of the FS box holder. The invention further includes an electrical box having a threaded socket therein and a box attachment means for securing the electrical box to the FS box holder. The box attachment means includes a threaded socket on the electrical box and a threaded nipple on the FS box holder.

OBJECTS AND ADVANTAGES

The object of the current invention is to provide a device and method for easily mounting a conventional FS electrical box to a cylindrical support.

BRIEF DESCRIPTION OF THE SEVERAL VIEWS OF THE DRAWING(S)

Reference is made herein to the accompanying drawings, which are not necessarily drawn to scale, and wherein.

Figure 5:
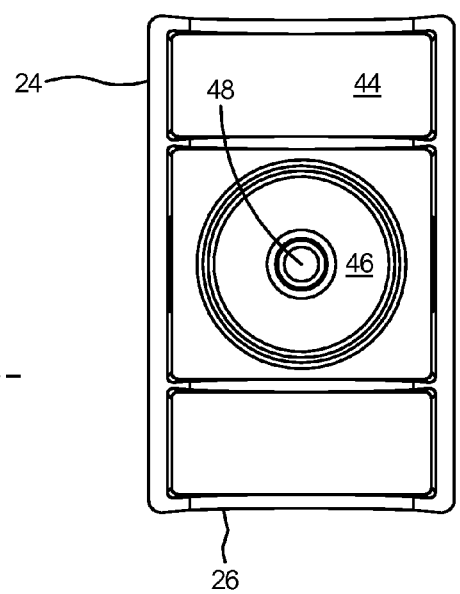

FIG. 5 a rear elevation view of the FS box holder.

Figure 2:
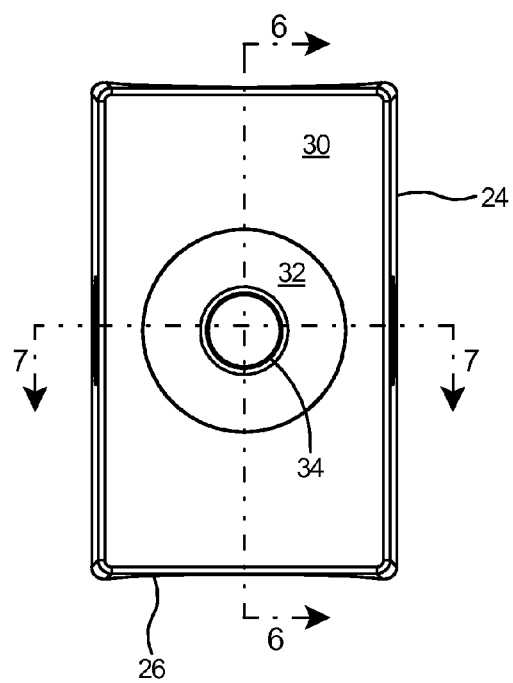
FIG. 2 is a front elevation view of the FS box holder.
Figure 3:
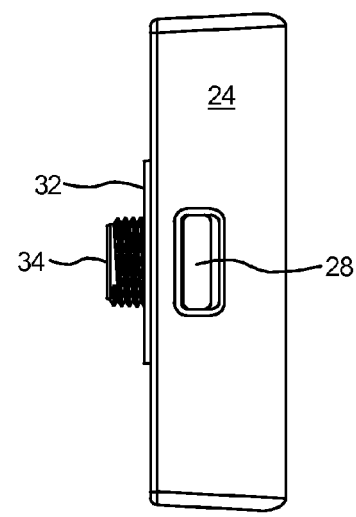
FIG. 3 is a side view of the FS box holder.
Figure 6:
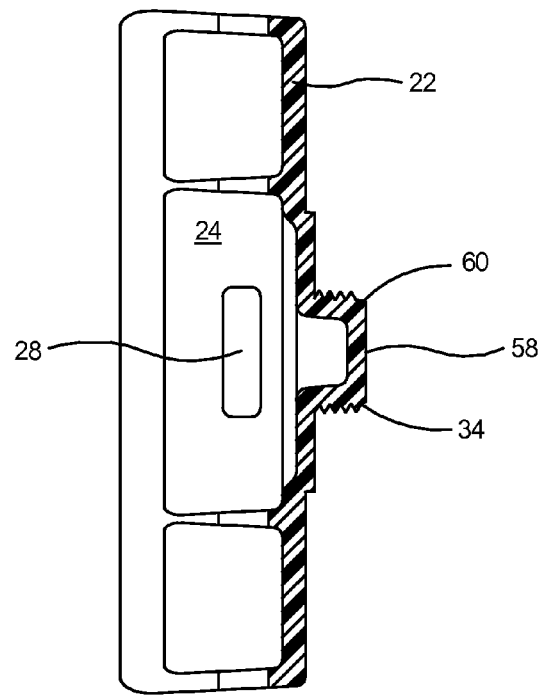

FIG. 6 is a sectional view of the FS box holder taken along line 6-6 of FIG. 2.

Figure 7:
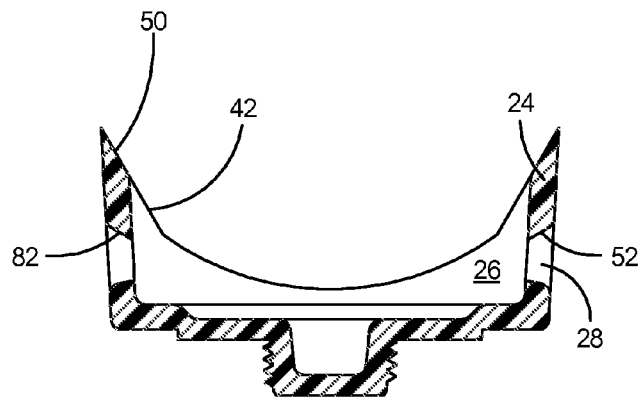

FIG. 7 is a sectional view of the FS box holder taken along line 7-7 of FIG. 2.

Figure 7A:
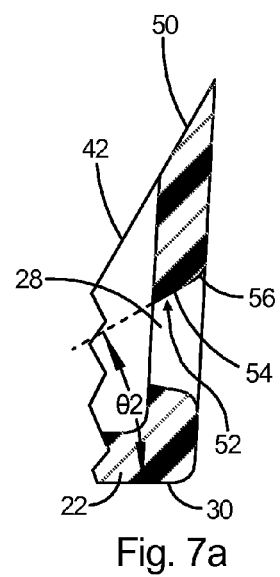

FIG. 7a is a detail view of the FS box holder as taken from the right side portion of FIG. 7.

Figure 1:
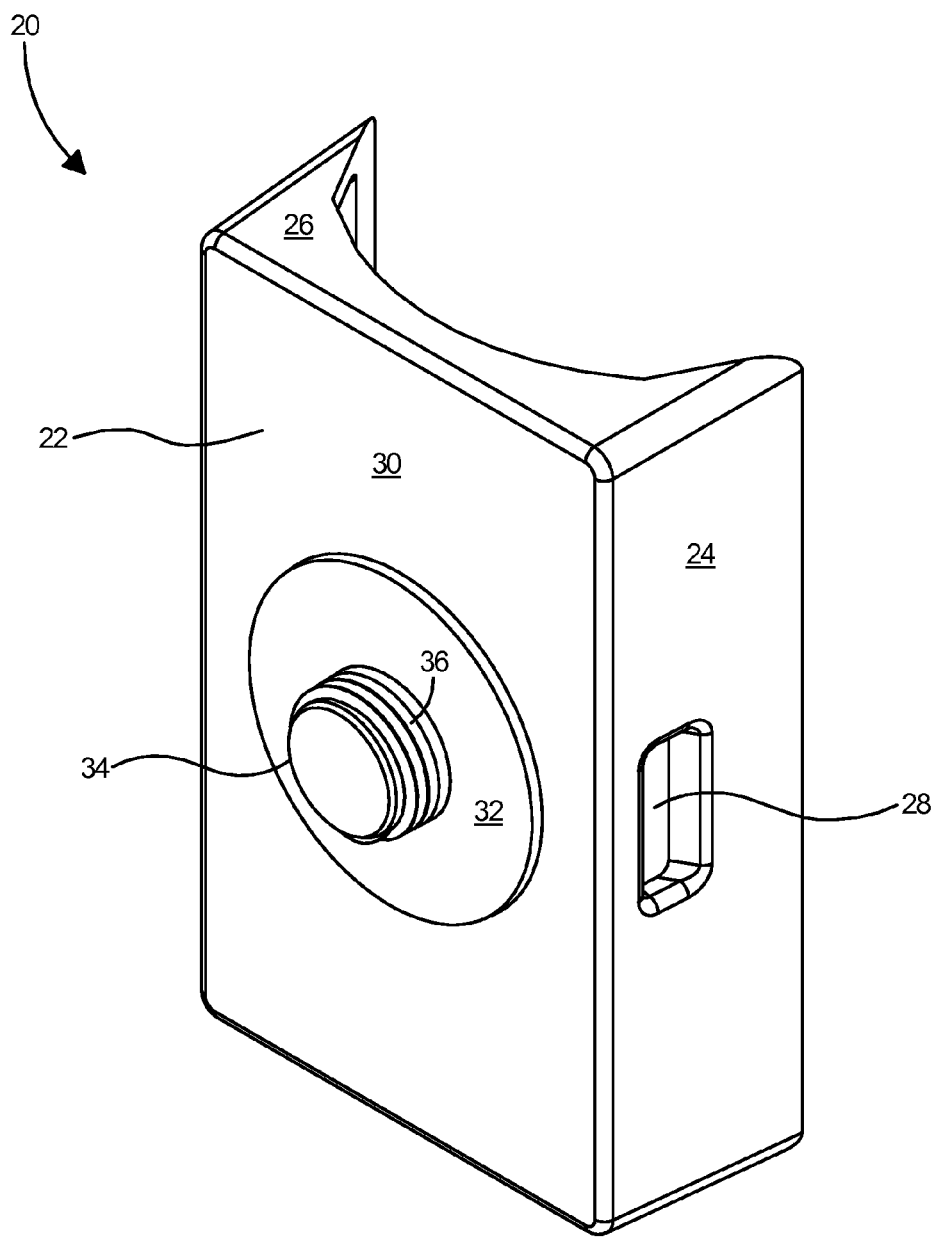
FIG. 1 is a front isometric view of a first and preferred embodiment of an FS box holder, in accordance with the present invention.
Figure 8:
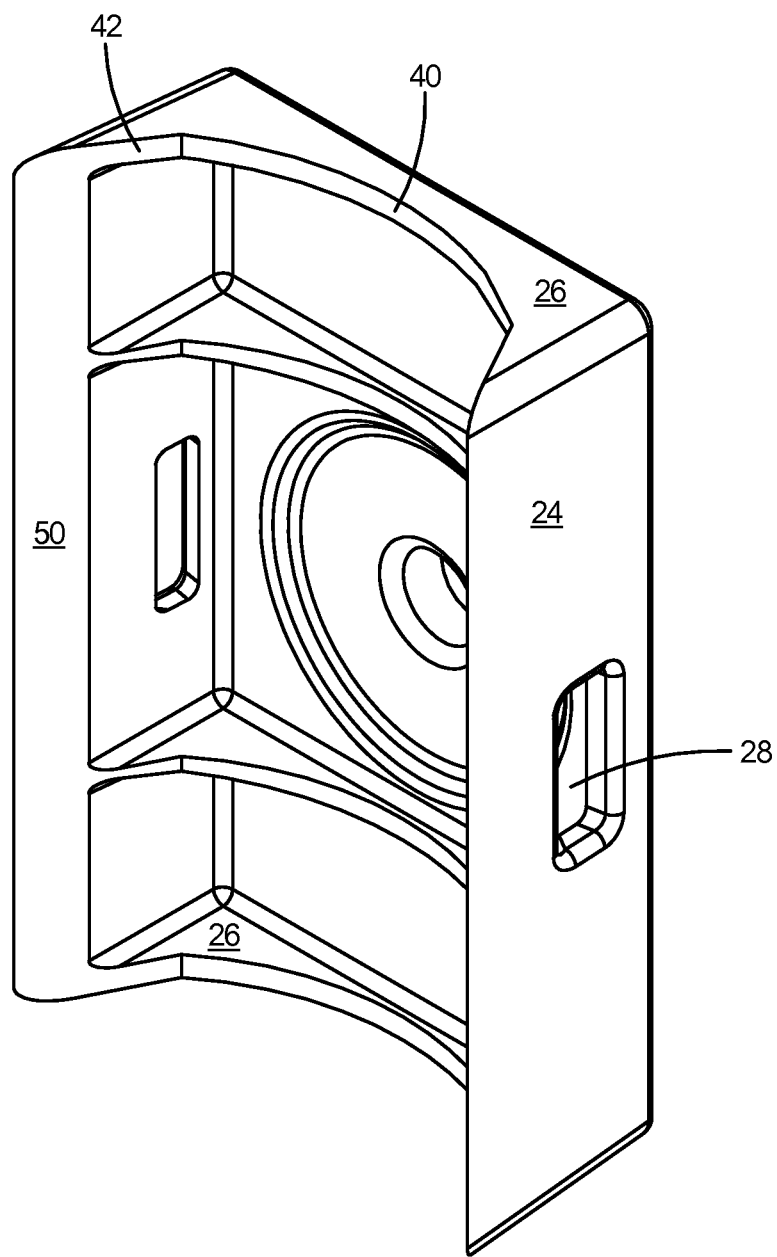

FIG. 8 is a rear isometric view of the FS box holder of FIG. 1.

Figure 9:
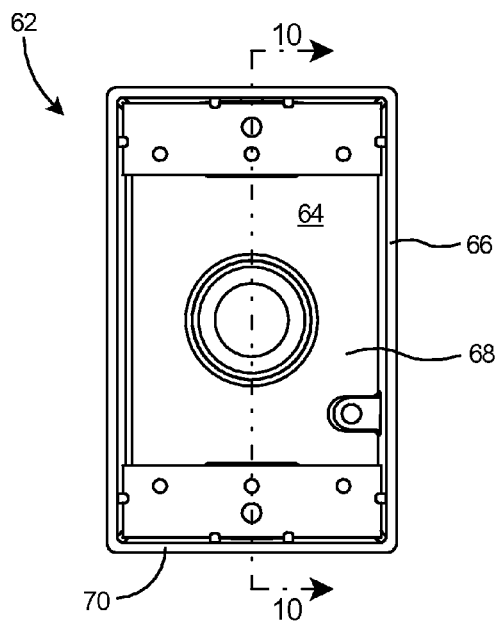

FIG. 9 is a front elevation view of an FS electrical box used in conjunction with the FS box holder of the present invention.

Figure 10:
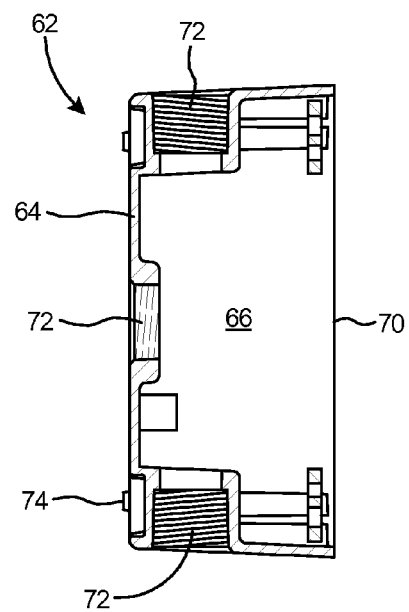

FIG. 10 is a sectional view of the FS electrical box taken along line 10-10 of FIG. 9.

Figure 11:
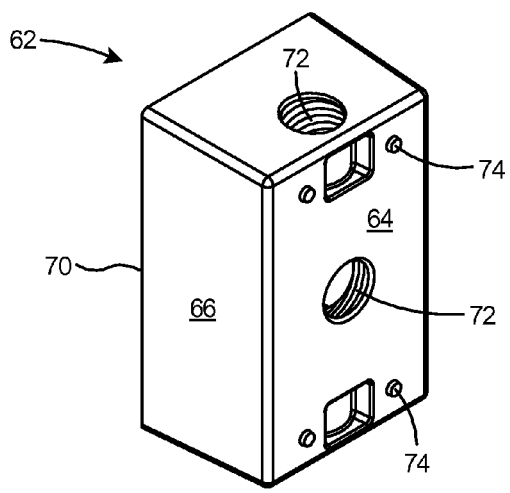

FIG. 11 is a rear isometric view of the FS electrical box of FIG. 9.

Figure 12:
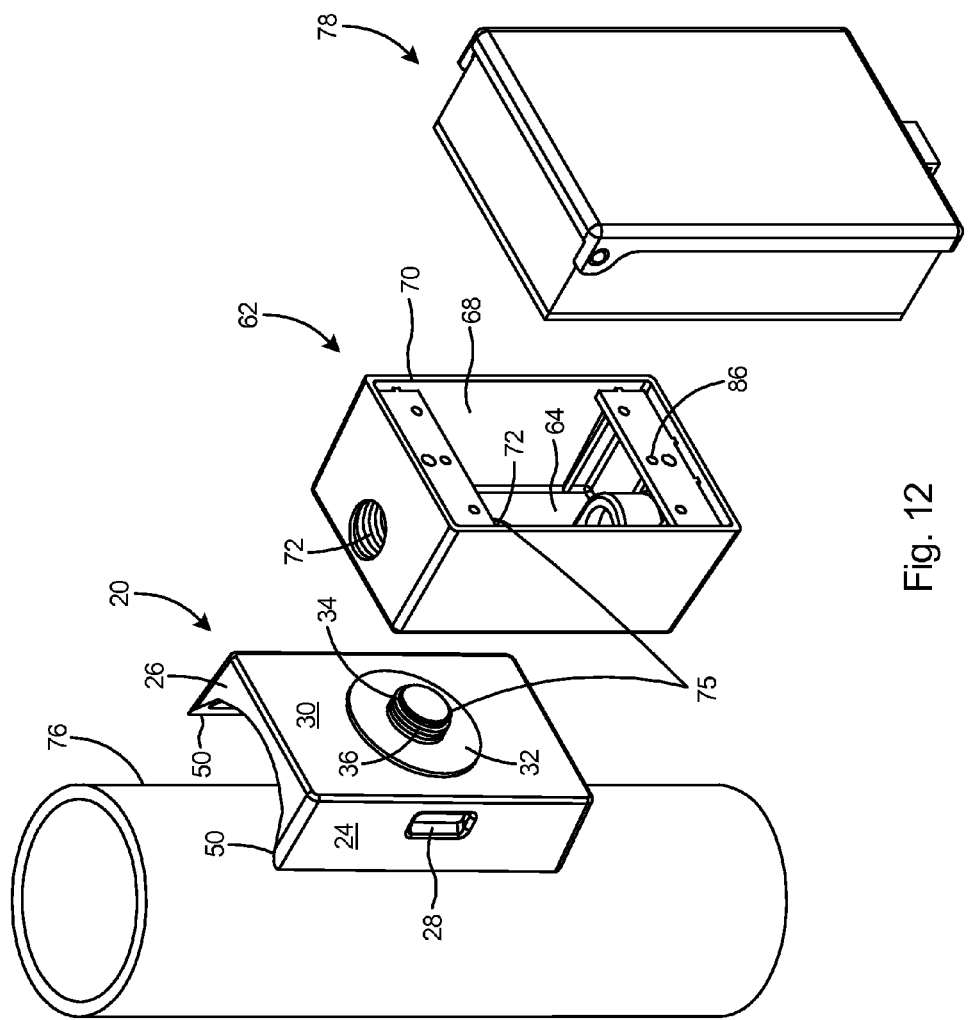

FIG. 12 is an exploded isometric view of the assembly of the FS box holder in alignment with an FS electrical box and a weatherproof cover to be assembled to a pipe in accordance with the present invention.

Figure 13:
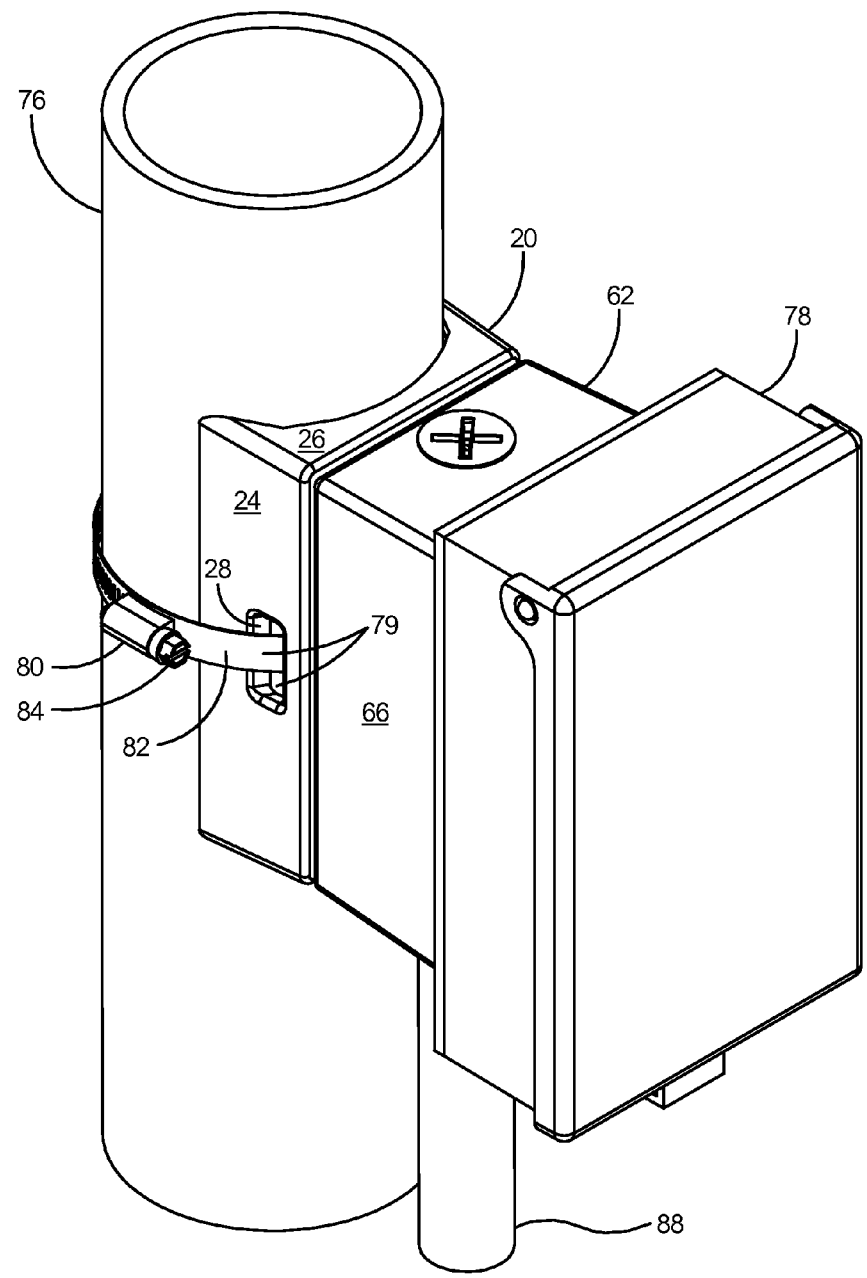

FIG. 13 depicts the FS box holder assembly securing an FS electrical box and a weatherproof cover to a pipe.

Figure 14:
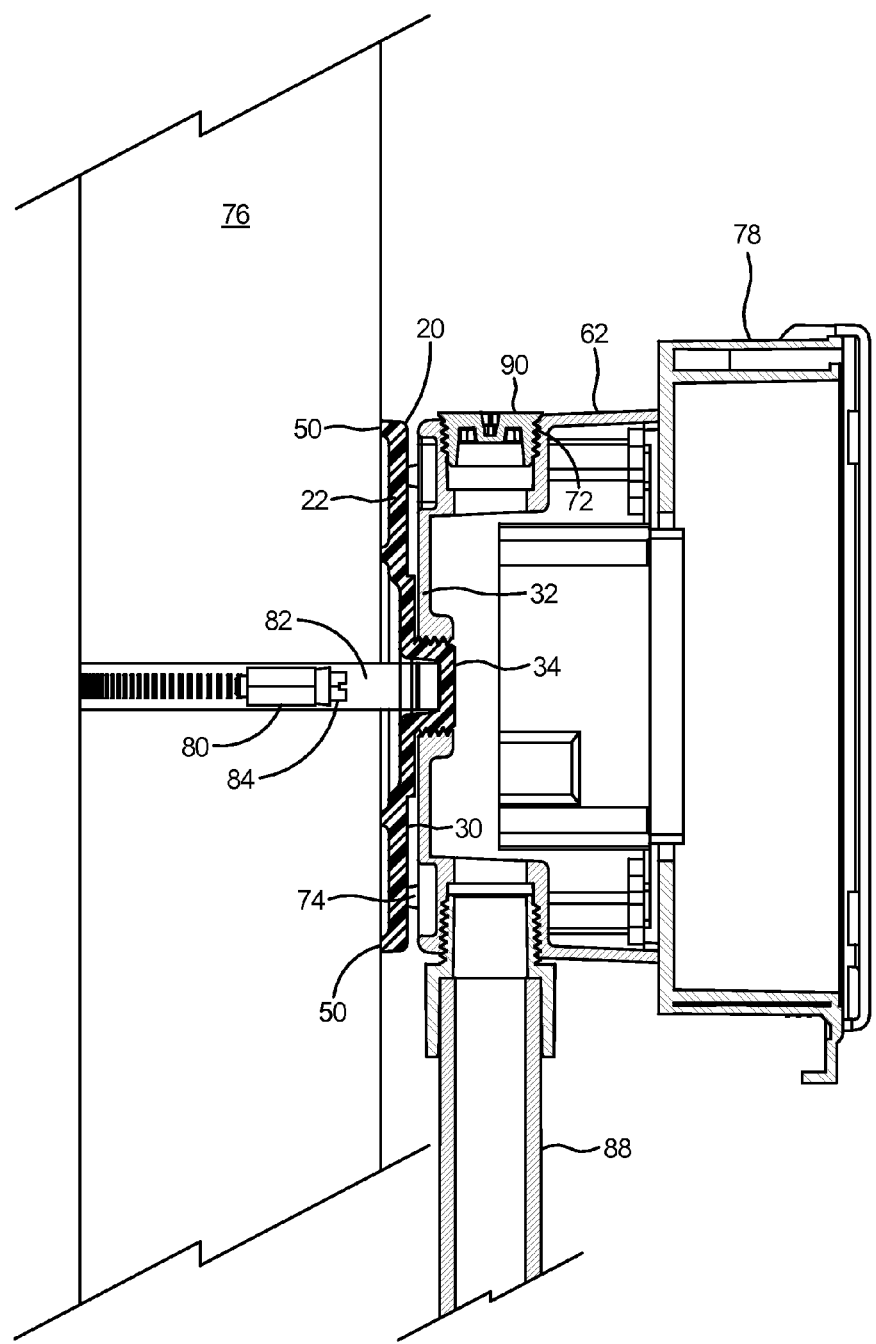

FIG. 14 is a sectional view of an FS box holder assembly securing an FS electrical box to a pipe.

Figure 15:
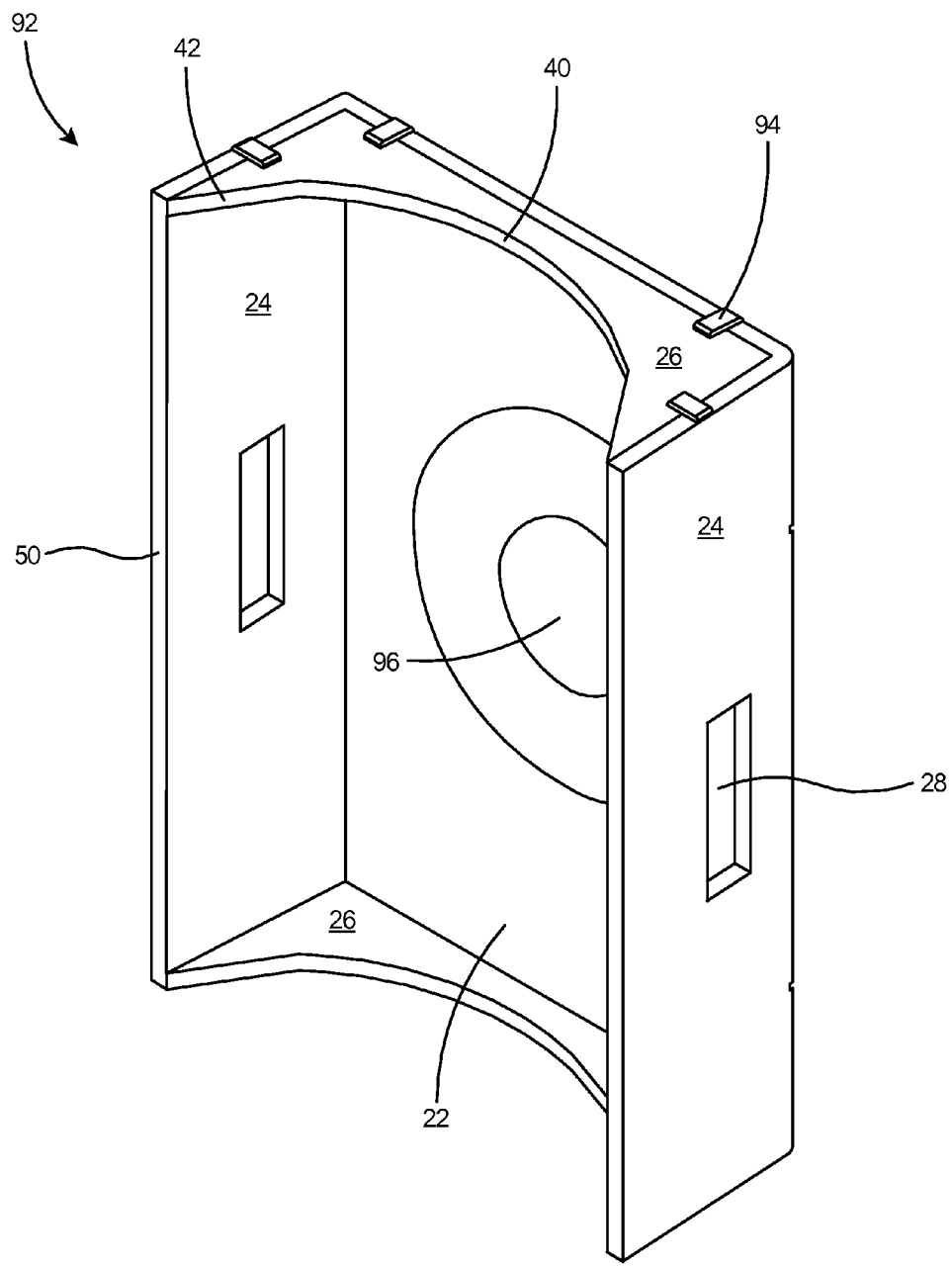

FIG. 15 is a rear isometric view of a second embodiment of the FS box holder according to the present invention.

Figure 16:
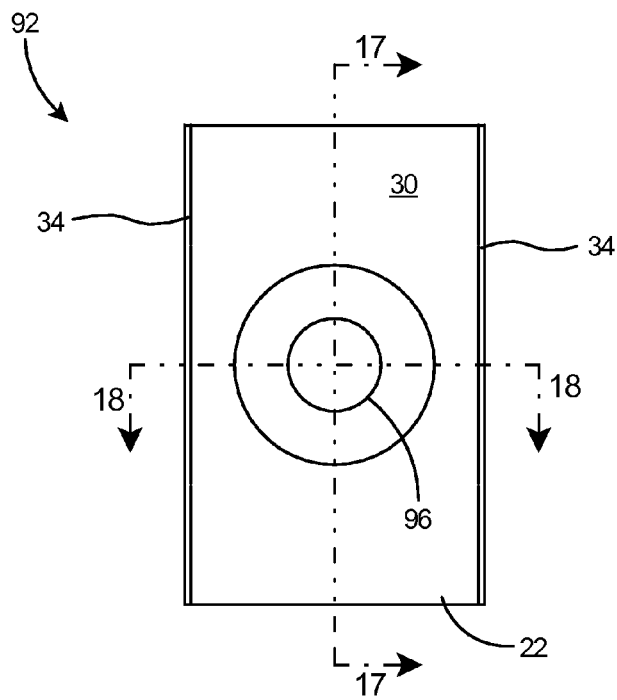

FIG. 16 is a front elevation view of the FS box holder of FIG. 15.

Figure 17:
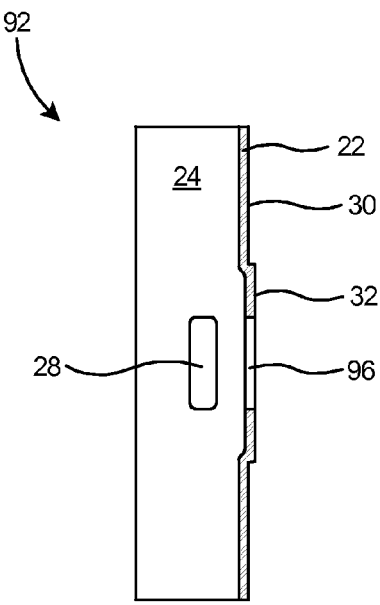

FIG. 17 is a sectional view of the FS box holder taken along line 17-17 of FIG. 16.

Figure 18:
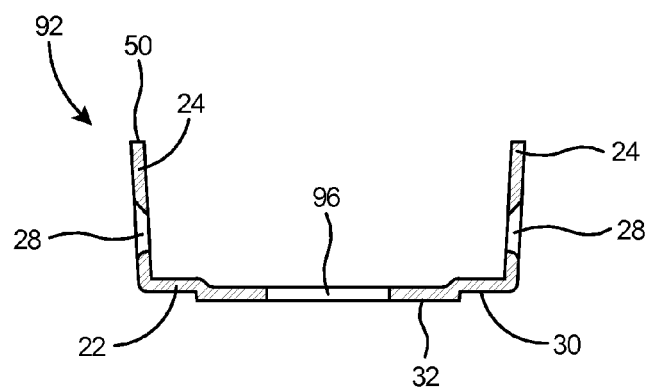

FIG. 18 is a sectional view of the FS box holder taken along line 18-18 of FIG. 16.

Figure 19:
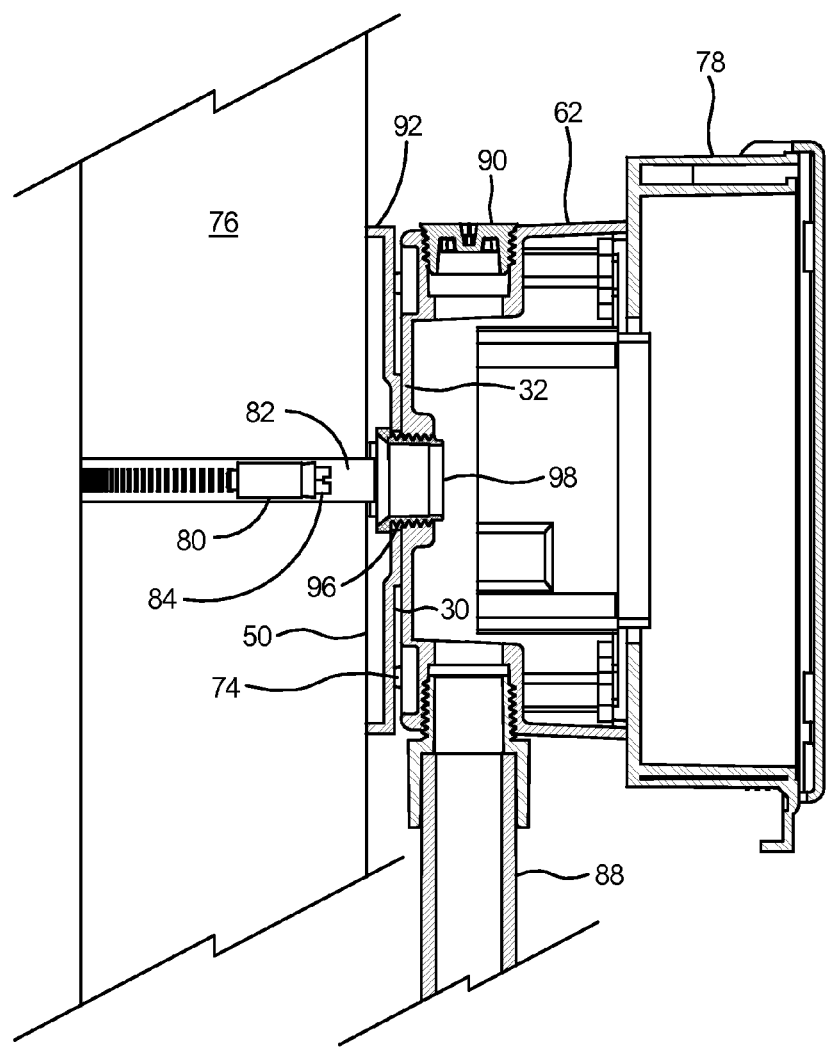

FIG. 19 is a sectional view of an FS box holder assembly depicting the second embodiment of the FS box holder securing an FS electrical box to a pipe.

DETAILED DESCRIPTION

The invention comprises an FS box holder for securing an FS (field service) electrical box to a post or similar support. The FS box holder is non-metallic and enables rapid and easy mounting of an FS electrical box to a post, pipe, or similar support.

A first and preferred embodiment of the invention is illustrated in FIGS. 1-8. As shown in FIG. 1, FS box holder 20 includes a front panel 22, two side walls 24, two end walls 26, and an elongated slot 28 in each side wall. The front panel 22 includes a front surface 30 including a raised area 32 and a threaded nipple 34 integral with the front panel 22 and extending from the raised area 32. Threaded nipple 34 includes a circular outer surface with threads 36 thereon. As shown in FIG. 2, the raised area 32 is preferably circular in shape and is centered on the front panel 22.

Figure 4:
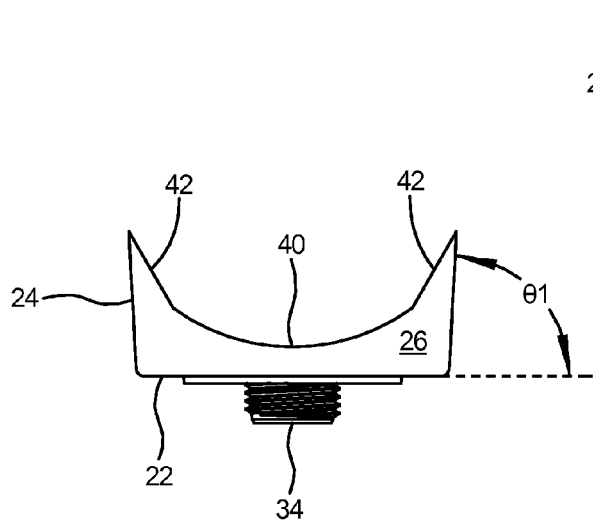
FIG. 4 is a top view of the FS box holder.

With reference to FIG. 4, the side walls 24 are preferably at an angle (θ1) of slightly greater than 90° with respect to the front panel 22. End walls 26 include a rear edge 38 that preferably includes an arcuate interior edge portion 40 and planar edge portions 42. As shown in FIG. 5, front panel 22 includes a rear surface 44, a recessed area 46, and an opening 48 within the hollow threaded nipple.

With reference to FIG. 7, each side wall 24 includes a rear edge 50 that at its ends is coextensive with the planar edge portion 42 of the end walls 26 and elongated slots 28 include rear edges 52. As shown in FIG. 7a, the rear edges 52 of elongated slots 28 include a planar edge portion 54 and an arcuate edge portion 56. Planar edge portion 54 of elongated slots 28 are preferably angled, as shown by angle θ2 in FIG. 7a, with respect to the front surface 30 of the front panel 22. Most preferably, the angle θ2 of the planar edge portion 54 with respect to the front surface 30 of the front panel 22 is 30°. As shown in FIG. 6, threaded nipple 34 includes an end 58 and a smooth end portion 60 as threads 36 of threaded nipple 34 terminate slightly before the end 58 of the threaded nipple. As shown in FIG. 8, rear edges 50 of side walls 24 extend the entire length of the FS box holder 20 between the two end walls 26.

With reference to FIGS. 9-11 there is shown a conventional FS or Field Service electrical box 62 that may be mounted to a post using the FS box holder of the present invention. The FS electrical box includes a rear wall 64 and side walls 66 defining an inner electrical cavity 68. The FS electrical box further includes a front face 70 and a plurality of threaded sockets 72 in the side walls 66 and rear wall 64. The rear wall 64 of FS electrical box 62 is flat and includes a plurality of nubs 74 extending therefrom as shown in FIGS. 10 and 11.

Referring to FIG. 12, the FS box holder 20 of the present invention is depicted in alignment with an FS electrical box 62, a pipe 76, and a weatherproof cover 78. The FS box holder 20 of the present invention enables rapid and easy mounting of an FS electrical box 62 to a post, pipe 76, or similar support. After an electrical component (not shown) is mounted within the FS electrical box 62, weatherproof cover 78 may be secured to the front face 70 of the FS electrical box 62 to provide a weatherproof environment for the inner electrical cavity 68 and the electrical component mounted therein. The threaded nipple 34 of the FS box holder 20 and a threaded socket 72 on the electrical box 62 provides a box attachment means 75, which is used for attaching the electrical box 62 to the FS box holder 20. The opposing rear edges 50 of the side walls 24 are spaced apart at a preferred distance and angled at a preferred angle with respect to one another in order to provide substantial contact with the circular pipe 76 that it will be mounted to.

With reference to FIG. 13, the FS box holder 20 of the present invention further includes a post attachment means 79, which post attachment means includes a pipe clamp 80 to secure the FS box holder to the pipe 76 and the elongated slots 28 of the FS box holder. The pipe clamp 80 is preferably of the proper size to encircle the pipe and extend through the elongated slots 28 of the FS box holder 20.

The present invention further comprises a method of mounting an FS electrical box to a post, pipe, or similar support. As shown in FIG. 12, the method includes securing the FS box holder 20 to the pipe 76 or similar support using a pipe clamp 80 (see FIG. 13). The bands 82 of the pipe clamp 80 are simply inserted through each of the elongated slots 28 in the FS box holder 20 and the pipe clamp 80 is tightened by turning screw 84 (see FIG. 13). A conventional FS electrical box 62, which includes a threaded socket 72 in the rear wall 64, is aligned with the threaded nipple 34 of the FS box holder 20 and the FS electrical box 62 is simply rotated until the threads 36 of threaded nipple 34 engage the complementary threads of the threaded socket 72. FS electrical box 62 is rotated onto threaded nipple 34 until the rear wall 64 of FS electrical box 62 is tight against the front surface 30 of the FS box holder 20. The installation may include the mounting of a weatherproof cover 78 to the front face 70 of the FS electrical box 62 in the conventional manner, such as by screws (not shown) through apertures 86 in the FS electrical box. Raised area 32 of FS box holder 20 engages the rear wall 64 of FS electrical box 62 and nubs 74 on the rear wall 64 of the FS electrical box 62 engage the front surface 30 of the FS box holder 20 thereby creating a tight fit between the FS electrical box 62 and the FS box holder. The completed installation is depicted in FIG. 13. Threaded conduit 88 may be screwed into the installed FS electrical box 62 in order to provide electrical supply to the electrical component (not shown) mounted within the FS electrical box 62, which is tightly secured to pipe 76.

With reference to FIG. 1, FS box holder 20 is most preferably molded in one piece of plastic, thus side walls 24 and end walls 26 are integral with front panel 22. The threads 36 of threaded nipple 34 are formed to be complementary with the threads (not shown) in the threaded socket 72 of a conventional FS electrical box 62 (see FIG. 11).

Referring to FIG. 14, there is shown a completed installation of the FS box holder 20 securing an FS electrical box 62 to a support 76. After pipe clamp 80 is tightened and FS electrical box 62 is screwed tightly onto threaded nipple 34 of FS box holder 20, FS electrical box 62 is securely attached to support 76. Rear edges 50 of side walls 24 engage the surface of the support 76 creating a tight fit of FS box holder 20 to support 76. Raised area 32 of FS box holder 20 engages the rear wall 64 of FS electrical box 62 and front surface 30 of FS box holder 20 are tightly engaged by nubs 74 of FS electrical box 62. Threaded electrical conduit 88 is then secured to FS electrical box 62 as required for the installation. Any unused threaded sockets 72 on FS electrical box 62 may be closed by means of a plug 90 as shown in FIG. 14.

With reference to FIG. 15 there is shown a second embodiment of an FS box holder 92 according to the present invention. FS box holder 92 is preferably constructed of metal, more preferably of steel, and most preferably of steel plate having a thickness of at least 0.094 inch. As in the first embodiment, FS box holder 92 includes a front panel 22, side walls 24, end walls 26, and elongated slots 28 in each side wall 24. The sidewalls 24 of FS box holder 92 further include rear edges 50. Front panel 22 is secured to side walls 24 and end walls 26 by tack welds 94. Front panel 22 includes an opening 96 therein.

Referring to FIGS. 16-19, the second embodiment of an FS box holder 92 further includes a raised area 32 on the front surface 30 of the front panel 22. Raised area 32 and front surface 30 are both flat surfaces.

As shown in FIG. 19, the second embodiment of the FS box holder 92 is assembled to a pipe 76 or similar support by a threaded nipple 98 that is pressed through the opening 96 in the front panel 22 of the FS box holder. After pipe clamp 80 is secured through the elongated slots 28 of the FS box holder 92, threaded nipple 98 is held within opening 96. The method of securing an FS electrical box 62 is the same as that of the first embodiment, excepting that threaded nipple 98 is first inserted within opening 96 in front panel 22 of FS electrical box 92 prior to rotating the FS electrical box 62 until the threads 36 of threaded nipple 98 engage the complementary threads of the threaded socket 72.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention for various embodiments with various modifications as are suited to the particular use contemplated.

What is claimed is:

1. A field service (FS) box holder assembly comprising:
   an FS box holder including
      a front panel having a front surface;

two side walls and two end walls extending from said front panel;

an elongated slot in said side walls;

a raised area integral with and extending from said front surface, said raised area including an outer periphery; and a threaded nipple extending from and integral with said raised area on said front surface of said front panel;

an FS box including a threaded socket; and said threaded nipple of said FS box holder including male threads complimentary to female threads on said threaded socket of said FS box, wherein attachment of said FS box to said FS box holder is by cooperative rotational engagement of said threaded nipple of said FS box holder into said threaded socket of said FS box.

2. The FS box holder assembly of claim 1, wherein said raised area of said FS box holder is centered on said front panel and said threaded nipple is centered on said raised area.

3. The FS box holder assembly of claim 1, wherein said side walls of said FS box holder are at an angle of slightly greater than 90° with respect to said front panel.

4. The FS box holder assembly of claim 1, wherein said end walls of said FS box holder include a rear edge.

5. The FS box holder assembly of claim 4, wherein said rear edge of said end walls of said FS box holder includes an arcuate interior edge portion.

6. The FS box holder assembly of claim 4 wherein said rear edge of said end walls of said FS box holder includes a planar edge portion.

7. The FS box holder assembly of claim 1 including rear edges on said elongated slot of said FS box holder.

8. The FS box holder assembly of claim 7, wherein said rear edges of said elongated slots of said FS box holder include a planar edge portion and an arcuate edge portion.

9. The FS box holder assembly of claim 1, wherein said rear wall of said FS box is flat and includes a plurality of nubs extending therefrom.

* * * * *